US008860906B2

(12) United States Patent
Choi et al.

(10) Patent No.: US 8,860,906 B2
(45) Date of Patent: Oct. 14, 2014

(54) DIRECTIONAL LIGHT GUIDE PLATE, DIRECTIONAL SURFACE LIGHT SOURCE, AND THREE-DIMENSIONAL IMAGE DISPLAY APPARATUS EMPLOYING THE DIRECTIONAL SURFACE LIGHT SOURCE

(75) Inventors: Kyu-hwan Choi, Yongin-si (KR); Hong-seok Lee, Seongnam-si (KR); Byung-hee Sohn, Yongin-si (KR); Yong-kweun Mun, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 95 days.

(21) Appl. No.: 13/285,241

(22) Filed: Oct. 31, 2011

(65) Prior Publication Data

US 2012/0105767 A1    May 3, 2012

(30) Foreign Application Priority Data

Nov. 1, 2010   (KR) .................. 10-2010-0107715

(51) Int. Cl.
| | | |
|---|---|---|
| *G02F 1/1335* | (2006.01) | |
| *F21V 7/04* | (2006.01) | |
| *F21V 8/00* | (2006.01) | |
| *G02B 27/22* | (2006.01) | |

(52) U.S. Cl.
CPC .............. *G02B 6/0038* (2013.01); *G02B 27/22* (2013.01); *G02B 6/0053* (2013.01)
USPC .................. 349/62; 349/15; 349/65; 362/617

(58) Field of Classification Search
None
See application file for complete search history.

(56) References Cited

U.S. PATENT DOCUMENTS

| | | | | |
|---|---|---|---|---|
| 5,584,556 | A * | 12/1996 | Yokoyama et al. | 349/62 |
| 7,903,183 | B2 * | 3/2011 | Jacobs et al. | 349/15 |
| 8,212,948 | B2 * | 7/2012 | Cornelissen et al. | 349/65 |
| 2005/0264717 | A1 | 12/2005 | Chien et al. | |
| 2007/0109811 | A1 * | 5/2007 | Krijn et al. | 362/619 |
| 2008/0084519 | A1 * | 4/2008 | Brigham et al. | 349/65 |
| 2008/0131667 | A1 | 6/2008 | King et al. | |
| 2008/0284801 | A1 * | 11/2008 | Brigham et al. | 345/690 |
| 2009/0207629 | A1 * | 8/2009 | Fujiyama et al. | 362/613 |
| 2009/0316058 | A1 * | 12/2009 | Huizinga et al. | 349/15 |
| 2011/0149202 | A1 * | 6/2011 | Sohn et al. | 349/62 |

FOREIGN PATENT DOCUMENTS

| | | |
|---|---|---|
| JP | 2005-321754 | 11/2005 |
| JP | 2007-240559 | 9/2007 |
| KR | 10-2005-033470 A | 4/2005 |
| KR | 10-2010-021437 A | 2/2010 |

* cited by examiner

*Primary Examiner* — Bumsuk Won
*Assistant Examiner* — Ryan Crockett
(74) *Attorney, Agent, or Firm* — NSIP Law

(57) ABSTRACT

Directional light guide plates, directional surface light sources, and three-dimensional (3D) image display apparatuses employing the directional surface light sources are provided. Each of the directional light guide plates includes a plurality of viewing zone separation units having a refractive index different from that of a light guide unit, for separating light into left and right viewing zones.

25 Claims, 11 Drawing Sheets

DIRECTIONAL LIGHT GUIDE PLATE, DIRECTIONAL SURFACE LIGHT SOURCE, AND THREE-DIMENSIONAL IMAGE DISPLAY APPARATUS EMPLOYING THE DIRECTIONAL SURFACE LIGHT SOURCE

CROSS-REFERENCE TO RELATED APPLICATIONS

This application claims the benefit under 35 U.S.C. §119(a) of Korean Patent Application No. 10-2010-0107715, filed on Nov. 1, 2010, in the Korean Intellectual Property Office, the disclosure of which is incorporated herein in its entirety by reference for all purposes.

BACKGROUND

1. Field

The following description relates to directional light guide plates, directional surface light sources, and three-dimensional (3D) image display apparatuses employing the directional surface light sources.

2. Description of the Related Art

A three-dimensional (3D) image display apparatus may include a two-dimensional (2D) display panel such as a liquid crystal display (LCD) panel. Such a 3D image display apparatus may be implemented as a stereoscopic type display apparatus or an autostereoscopic type display apparatus. The stereoscopic type display apparatus uses, for example, polarized glasses or liquid crystal shutter glasses. The autostereoscopic type display apparatus includes an apparatus in which a viewing zone separation optical plate is bonded onto a front surface of a flat display panel, e.g., an apparatus using a lenticular lens or an apparatus using a parallax barrier. For example, in the 3D image display apparatus using a lenticular lens, the lenticular lens, in which a plurality of cylinder lens having a small pitch are aligned, is positioned in front of a 2D display panel. Accordingly, images on a 2D display panel are divided into viewing zones in a horizontal direction by the lenticular lens. As such, a viewer may view different 2D images in each eye according to a binocular parallax through which left and right eyes are positioned in viewing zones. Thus, the viewer may experience a 3D effect.

SUMMARY

According to one general aspect, there is provided a directional light guide plate that includes a light guide unit including first and second incident surfaces respectively formed on first and second side surfaces on substantially opposing sides of the light guide unit, for guiding light incident on the first and second incident surfaces via total internal reflection inside the light guide unit; and a plurality of viewing zone separation units formed of a substantially transparent material having a refractive index greater than that of the light guide unit, each of the plurality of viewing zone separation units being aligned in parallel with each other and disposed in a flat third surface of the light guide unit, wherein each of the plurality of viewing zone separation units includes a first interface contacting the light guide unit and extending in a lengthwise direction with respect to the first incident surface; a second interface contacting the light guide unit and extending in a lengthwise direction with respect to the second incident surface; and an exit surface, and wherein the first and second interfaces are formed so that light incident on the first incident surface and light incident on the second incident surface are separated into different viewing zones.

Each of the plurality of viewing zone separation units may be formed in a shape in which a first inclination angle between the first interface and the exit surface differs according to a distance from the first incident surface and a distance from the second incident surface, and a second inclination angle between the second interface and the exit surface differs according to the distance from the first incident surface and the distance from the second incident surface. That is, the first interface of one of the plurality of viewing zone separation units may have an inclination angle different from that of the first interface of any other of the plurality of viewing zone separation units, and the second interface of one of the plurality of viewing zone separation units may have an inclination angle different from that of the second interface of any other of the plurality of viewing zone separation units.

Furthermore, each of the plurality of viewing zone separation units may be formed in a shape in which the first inclination angle decreases from the first incident surface to the second incident surface and the second inclination angle increases from the first incident surface to the second incident surface.

Additionally, each of the plurality of viewing zone separation units may be formed in a shape in which the first inclination angle decreases by a first incremental value for each of the plurality of viewing zone separation units from the first incident surface toward the second incident surface and the second inclination angle increases by a second incremental value for each of the plurality of viewing zone separation units from the first incident surface toward the second incident surface.

Also, if the number of the plurality of viewing zone separation units is N, the first inclination angle between the first interface and the exit surface of a $k^{th}$ viewing zone separation unit from the first incident surface may be substantially the same as the second inclination angle between the second interface and the exit surface of a $(N-k)^{th}$ viewing zone separation unit from the first incident surface. That is, the plurality of viewing zone separation units may have a substantially symmetrical shape between the first and second incident surfaces.

Each of the plurality of viewing zone separation units may have a triangular or trapezoidal cross-section having linear or curved sides, wherein the cross-section is taken in a direction perpendicular to a lengthwise direction of the plurality of viewing zone separation units. For example, if each of the plurality of viewing zone separation units has a shape of a prism, the first and second interfaces and the exit surface may be three surfaces of the prism.

The plurality of viewing zone separation units may be spaced apart from each other. In this case, the plurality of viewing zone separation units may be spaced apart from each other by a gap of about 0.1 µm to 300 µm. Also, the exit surface of each of the plurality of viewing zone separation units may have a length of about 0.1 µm to 100 µm in a direction from the first incident surface toward the second incident surface.

The directional light guide plate may further include a cover unit disposed on the exit surface of each of the plurality of viewing zone separation units, wherein the cover unit has a refractive index equal to or greater than that of the plurality of viewing zone separation units.

The light guide unit may further include a first transparent body in contact with the first and second incident surfaces; and a second transparent body in contact with the first and second interfaces of each of the plurality of viewing zone separation units. In this case, the second transparent body may be formed of a transparent material having a refractive index equal to or greater than that of the first transparent body, and less than that of the plurality of viewing zone separation units, and the first and second transparent bodies may be bonded to each other. Also, the second transparent body may be bonded to the plurality of viewing zone separation units to form a film sheet to be bonded to one flat surface of the first transparent body.

According to another general aspect, there is provided a directional surface light source includes a directional light guide plate including a flat-panel light guide unit including first and second incident surfaces respectively formed on first and second side surfaces on substantially opposing sides of the light guide unit, for guiding light incident on the first and second incident surfaces via total internal reflection inside the light guide unit; and a plurality of viewing zone separation units formed of a substantially transparent material having a refractive index greater than that of the light guide unit, each of the plurality of viewing zone separation units being aligned in parallel with each other and disposed in a flat third surface of the light guide unit; and a light source unit including a first light source disposed proximate to the first incident surface of the directional light guide plate; and a second light source disposed proximate to the second incident surface of the directional light guide plate, wherein each of the plurality of viewing zone separation units includes a first interface contacting the light guide unit and extending in a lengthwise direction with respect to the first incident surface; a second interface contacting the light guide unit and extending in a lengthwise direction with respect to the second incident surface; and an exit surface, wherein the first and second interfaces are formed so that light incident on the first incident surface and light incident on the second incident surface are separated into different viewing zones, and wherein the first and second light sources are driven in a substantially alternating or simultaneous manner.

The light source unit may further include a third light source disposed proximate to the first incident surface of the directional light guide plate, having a light emitting point different from that of the first light source; and a fourth light source disposed proximate to the second incident surface of the directional light guide plate, having a light emitting point different from that of the second light source. In this case, the third light source may be aligned substantially in parallel with the first light source in a direction perpendicular to the flat third surface of the directional light guide plate, and the fourth light source may be aligned substantially in parallel with the second light source in the direction perpendicular to the flat third surface of the directional light guide plate.

According to another general aspect, there is provided a three-dimensional (3D) image display apparatus includes a directional surface light source including a directional light guide plate including a light guide unit including first and second incident surfaces respectively formed on first and second side surfaces on substantially opposing sides of the light guide unit, for guiding light incident on the first and second incident surfaces via total internal reflection inside the light guide unit; and a plurality of viewing zone separation units formed of a substantially transparent material having a refractive index greater than that of the light guide unit, each of the plurality of viewing zone separation units being aligned in parallel with each other and disposed in a flat third surface of the light guide unit; and a light source unit including a first light source disposed proximate to the first incident surface of the directional light guide plate; and a second light source disposed proximate to the second incident surface of the directional light guide plate; a display panel disposed proximate to an emission surface of the directional surface light source, to display an image; and a control unit to control the directional surface light source and the display panel, wherein each of the plurality of viewing zone separation units includes a first interface contacting the light guide unit and extending in a lengthwise direction with respect to the first incident surface; a second interface contacting the light guide unit and extending in a lengthwise direction with respect to the second incident surface; and an exit surface, wherein the first and second interfaces are formed so that light incident on the first incident surface and light incident on the second incident surface are separated into different viewing zones, and wherein the control unit drives the first and second light sources of the directional surface light source in a substantially alternating manner in a 3D mode, and drives the first and second light sources of the directional surface light source in a substantially simultaneous manner in a two-dimensional (2D) mode.

The light source unit may further include a third light source disposed proximate to the first incident surface of the directional light guide plate, having a light emitting point different from that of the first light source; and a fourth light source disposed proximate to the second incident surface of the directional light guide plate, having a light emitting point different from that of the second light source, and the control unit may drive the first through fourth light sources in a substantially sequential manner in the 3D mode, and may drive the first through fourth light sources in a substantially simultaneous manner in the 2D mode. In this case, the third light source may be aligned substantially in parallel with the first light source in a direction perpendicular to the flat third surface of the directional light guide plate, and the fourth light source may be aligned substantially in parallel with the second light source in the direction perpendicular to the flat third surface of the directional light guide plate.

Other features and aspects may be apparent from the following detailed description, the drawings, and the claims.

Figure 1:
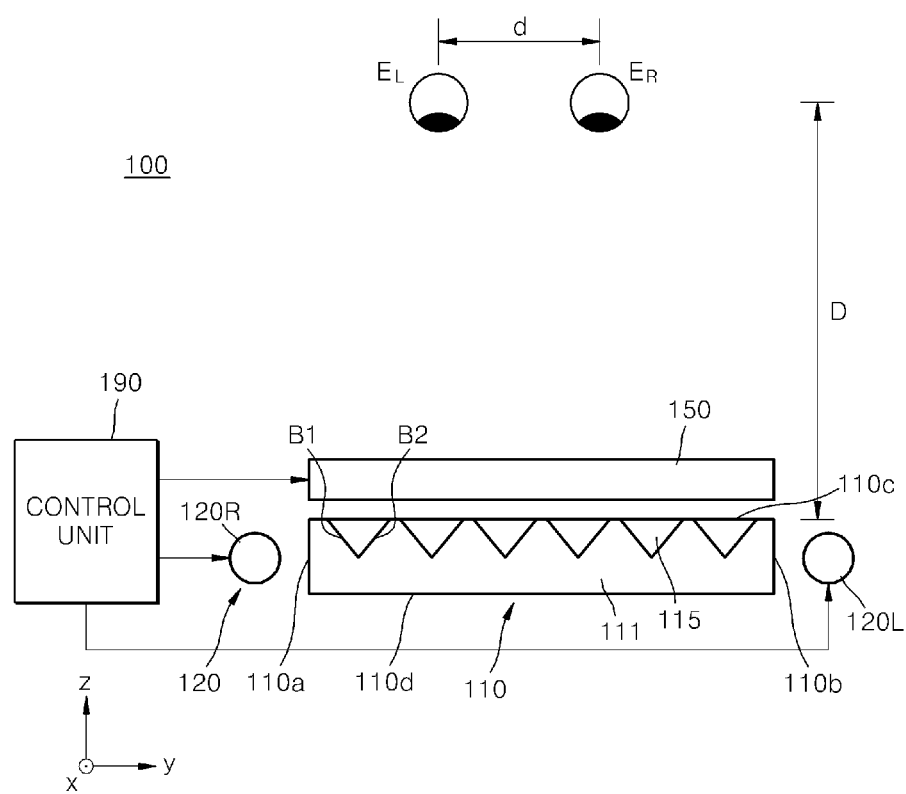
FIG. 1 is a diagram illustrating an example of a three-dimensional (3D) image display apparatus.

Throughout the drawings and detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness. As described herein, it is noted that terminology such as "totally internally reflected" is provided for descriptive purposes for the understanding of one of ordinary skill in the art; that is, it should be understood that such language is intended to indicate that substantially all light is reflected.

Figure 2:
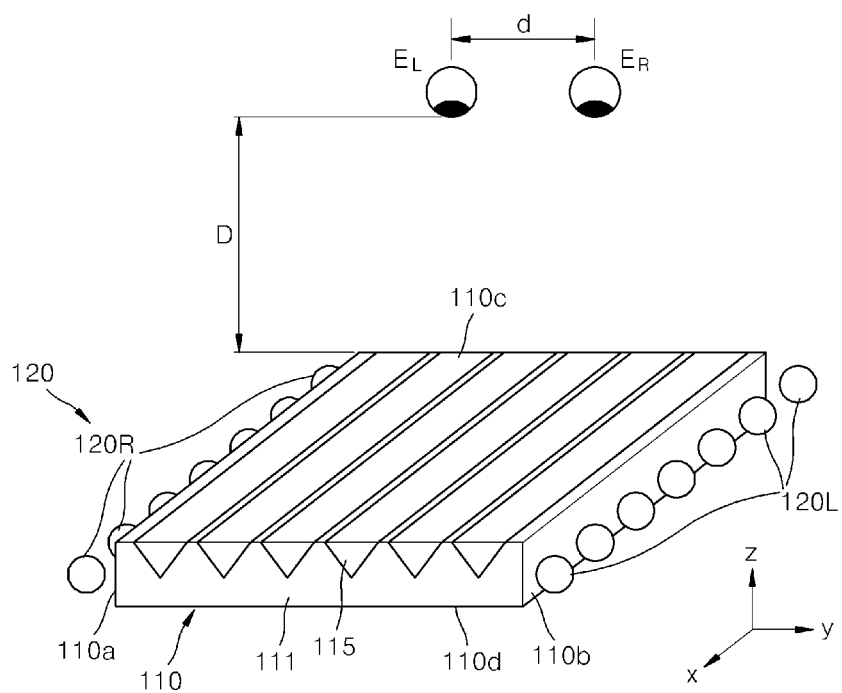
FIG. 2 is a diagram illustrating a perspective view of an example of a directional surface light source of a 3D image display apparatus.
Figure 3:
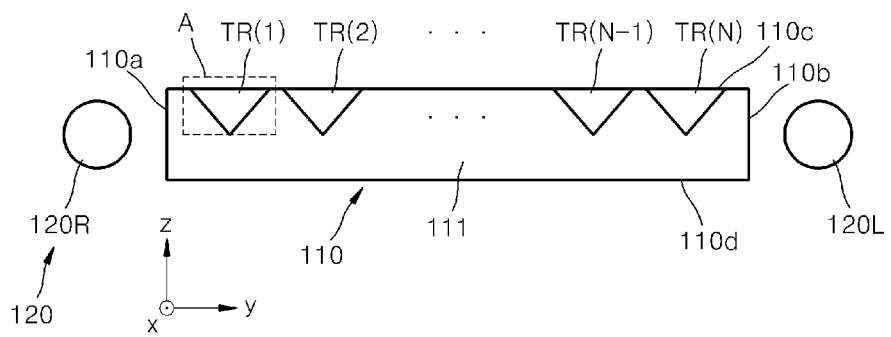
FIG. 3 is a diagram illustrating a cross-sectional view of an example of a directional surface light source.
Figure 4:
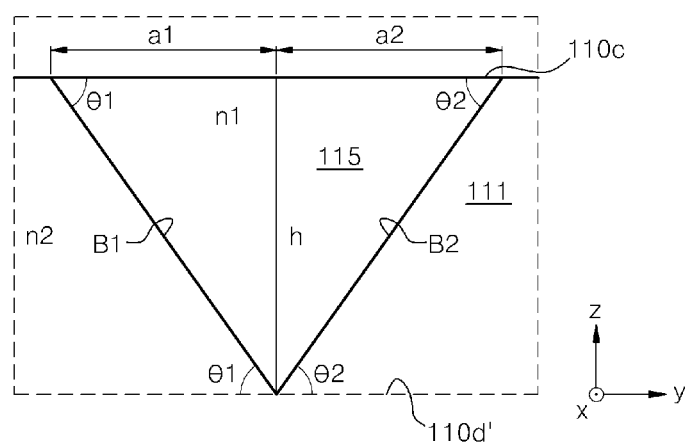
FIG. 4 is a diagram illustrating an example of an enlarged view of a region A illustrated in FIG. 3.

FIG. 1 illustrates an example of a three-dimensional (3D) image display apparatus 100. FIG. 2 illustrates a perspective view of an example of a directional surface light source that may be included in the 3D image display apparatus 100 illustrated in FIG. 1. FIG. 3 illustrates a cross-sectional view of the directional surface light source illustrated in FIG. 2. FIG. 4 illustrates an enlarged view of a region A illustrated in FIG. 3.

Referring to FIGS. 1 through 4, the 3D image display apparatus 100 includes a directional light guide plate 110, a light source unit 120, a display panel 150, and a control unit 190.

The directional light guide plate 110 includes a flat-panel light guide unit 111, and a plurality of viewing zone separation units 115 formed in one flat surface of the light guide unit 111.

The light guide unit 111 guides light with total internal reflection in the light guide unit 111, and may be a flat panel formed of a transparent material. For example, as illustrated in FIG. 2, the light guide unit 111 may be a flat panel having a hexahedral shape, with two wide flat surfaces and four side surfaces. Of the four side surfaces, the two surfaces of the light guide unit 111 facing the light source unit 120 form first and second incident surfaces 110a and 110b of the directional light guide plate 110. One of the two wide flat surfaces of the light guide unit 111 includes the viewing zone separation units 115 to form an exit surface 110c of the directional light guide plate 110. The other of the two wide flat surfaces of the light guide unit 111, i.e., a rear surface 110d of the directional light guide plate 110, may include a light guide pattern for substantially uniformly guiding incident light with total internal reflection. In further examples, some or all of the side surfaces of the light guide unit 111 may be curved, and in other examples the light guide unit 111 may have five or more side surfaces. The light guide unit 111 may be formed in the form of a film having a thickness of, for example, approximately several hundred μm.

The viewing zone separation units 115 may be formed along one of the two wide flat surfaces of the light guide unit 111. The viewing zone separation units 115 separate light incident on the first incident surface 110a and light incident on the second incident surface 110b into different viewing zones, while emitting light from the directional light guide plate 110, by frustrated total internal reflection.

The viewing zone separation units 115 may be formed of a transparent material having a refractive index greater than that of the light guide unit 111, in order to prevent total internal reflection of light on first and second interfaces B1 and B2 between the light guide unit 111 and the viewing zone separation units 115.

Each of the viewing zone separation units 115 may have a shape of a prism that extends in a lengthwise direction along the first and second incident surfaces 110a and 110b, i.e., a direction along the x-axis, and has a triangular cross-section in a direction perpendicular to the lengthwise direction, i.e., in the y-z plane. Meanwhile, indentations on one of the surfaces of the light guide unit 111 may be formed in the shape of prisms that are complementary to the viewing zone separation units 115, such that two of the surfaces of each of the viewing zone separation units 115 are located inside the light guide unit 111, and the other surface of each of the viewing zone separation units 115 may be positioned substantially co-planar to the surface of the light guide unit 111 where the indentations are formed. That is, each of the viewing zone separation units 115 may have a shape of a prism having the first and second interfaces B1 and B2 contacting and forming boundaries with the light guide unit 111, and an exposed exit surface. The exit surfaces of the viewing zone separation units 115 may be disposed in the exit surface 110c of the directional light guide plate 110. The viewing zone separation units 115 may be spaced apart and aligned substantially in parallel with each other in one flat surface of the light guide unit 111. For example, the viewing zone separation units 115 may be spaced apart from each other by a gap of 0.1 μm to 300 μm.

Meanwhile, the viewing zone separation units 115 are designed to separate light into at least two viewing zones that are spaced apart from each other by a distance d between left and right eyes $E_L$ and $E_R$ of a viewer at a viewing distance D from the exit surface 110c of the directional light guide plate 110. In order to provide the viewing zones, the viewing zone separation units 115 may be designed in such a way that a first inclination angle θ1 between the first interface B1 and the exit surface 110c decreases for each consecutive zone separation unit 115 from the first incident surface 110a toward the second incident surface 110b. Similarly, the viewing zone separation units 115 may be designed such that a second inclination angle θ2 between the second interface B2 and the exit surface 110c increases for each consecutive zone separation unit 115 from the first incident surface 110a toward the second incident surface 110b.

For example, the first inclination angle θ1 may be designed to constantly decrease by an increment Δθ from the first incident surface 110a toward the second incident surface 110b, and the second inclination angle θ2 may be designed to constantly increase by the increment Δθ from the first incident surface 110a toward the second incident surface 110b. That is, as illustrated in FIG. 3, if the viewing zone separation units 115 are indicated as TR(1) through TR(N) in an order from the first incident surface 110a toward the second incident surface 110b, a first inclination angle θ1(k) and a second inclination angle θ2(k) of a kth viewing zone separation unit TR(k) may be designed as represented in Equations 1 and 2.

$$\theta1(k)=\theta1(1)-(k-1)\times\Delta\theta \qquad \text{[Equation 1]}$$

$$\theta2(k)=\theta2(1)-(k-1)\times\Delta\theta \qquad \text{[Equation 2]}$$

Meanwhile, each of the viewing zone separation units 115 may be designed to have the same height h. Alternatively, each of the viewing zone separation units 115 may be designed to have the same width a1+a2 on the exit surface 110c. The first and second inclination angles θ1 and θ2 of each of the viewing zone separation units 115 may vary according to, for example, the refractive indices of the light guide unit 111 and the viewing zone separation units 115, the position of the viewer, or the light guide pattern formed on the rear surface 110d of the directional light guide plate 110.

Also, the directional light guide plate 110 may be designed to separate the viewing zones to be bilaterally symmetrical to each other. In this case, the viewing zone separation units 115 may have a symmetrical shape between the first and second incident surfaces 110a and 110b. That is, as illustrated in FIGS. 3 and 4, the first inclination angle θ1 of the kth viewing zone separation unit TR(k) may be substantially the same size as the second inclination angle θ2 of an (N−k+1)th viewing zone separation unit TR(N−k+1). In this case, k is an integer between 1 through N. As such, left and right viewing zones separated by the directional light guide plate 110 may be bilaterally symmetrical in front of the display panel 150 and thus may be optimized when the viewer is located in front of the display panel 150. In some cases, the directional light guide plate 110 may be designed to separate the left and right viewing zones to be bilaterally asymmetrical to each other. In this case the viewing zone separation units 115 may have an asymmetrical shape between the first and second incident surfaces 110a and 110b.

The exit surface of each of the viewing zone separation units 115 may have a length of 0.1 μm to 100 μm in a direction from the first incident surface 110a toward the second incident surface 110b, i.e., in a direction along the y-axis. For example, if the viewing distance D of a mobile display apparatus, as an example of the 3D image display apparatus 100, is about 300 mm to about 500 mm, the directional light guide plate 110 may be designed as shown in Table 1.

TABLE 1

| n1 | 1.64 |
|---|---|
| n2 | 1.49 |
| N | 100 |
| θ1 | 65°~63° |
| θ2 | 63°~65° |
| H | 100 μm |
| a1, a2 | 46.6 μm~51.0 μm |

In Table 1, n1 represents the refractive index of the viewing zone separation units 115, n2 represents the refractive index of the light guide unit 111, and N represents the number of viewing zone separation units 115.

The light guide unit 111 and the viewing zone separation units 115 included in the directional light guide plate 110 may be formed of rigid or flexible materials. In addition, the viewing zone separation units 115 are not limited to a prism shape having a triangular cross-section, for example, the first and second interfaces B1 and B2 of the viewing zone separation units 115 may be curved to provide the left and right viewing zones. Also, each of the viewing zone separation units 115 may have a trapezoidal cross-section instead of a triangular cross-section.

The light source unit 120 includes a first light source 120R disposed at a side of the first incident surface 110a of the directional light guide plate 110, and a second light source 120L disposed at a side of the second incident surface 110b of the directional light guide plate 110. The first and second light sources 120R and 120L may be linear light sources corresponding to the first and second incident surfaces 110a and 110b of the directional light guide plate 110. For example, the first and second light sources 120R and 120L may be arrays of light emitting diodes (LEDs) aligned along the first and second incident surfaces 110a and 110b, respectively. As other examples, each of the first and second light sources 120R and 120L may be a cold cathode fluorescent lamp (CCFL) or other light source. In order to minimize the loss of light emitted from the first and second light sources 120R and 120L, each of the first and second light sources 120R and 120L may have a reflective mirror (not shown).

The directional light guide plate 110 and the light source unit 120 may form a directional surface light source for emitting directional light separated into viewing zones to the display panel 150.

The display panel 150 may be a device on which an image is displayed, and may be, for example, a transmissive display panel such as a liquid crystal panel, a polymer dispersed liquid crystal panel, an electrowetting display panel, an electrochromic display panel, or the like.

The control unit 190 controls the light source unit 120 and the display panel 150, and detailed descriptions thereof will be substituted by descriptions of the operation of the 3D image display apparatus 100.

Figure 5:
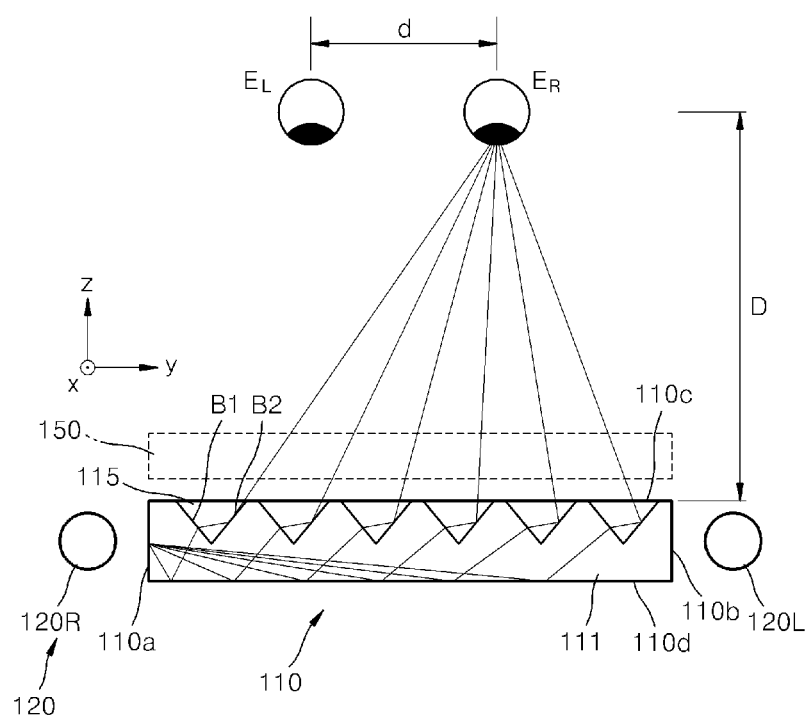
FIGS. 5 and 6 are diagrams illustrating cross-sectional views for a 3D mode operation of a 3D image display apparatus.
Figure 6:
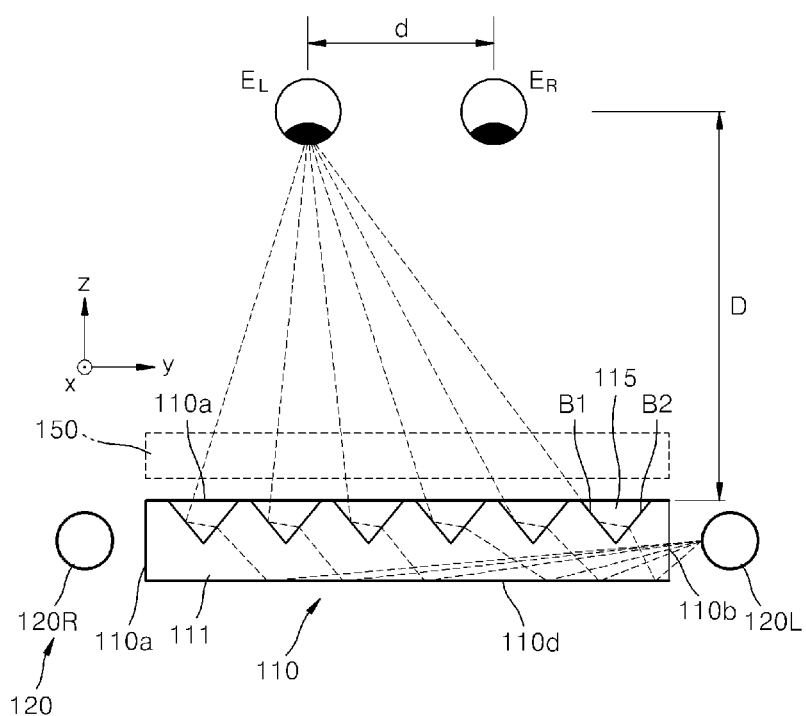
Figure 7:
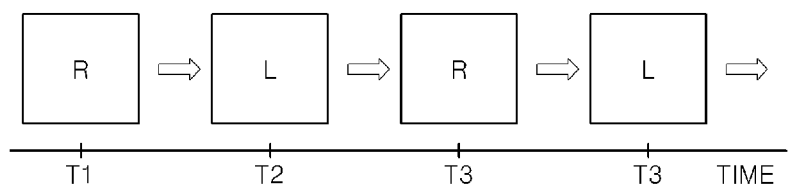
FIG. 7 is a diagram illustrating time-sequentially displayed images on a display panel in a 3D mode of a 3D image display apparatus.

A 3D mode operation of the 3D image display apparatus 100 is described herein with reference to FIGS. 5 through 7.

FIG. 5 illustrates a cross-sectional view of the operation of the directional light guide plate 110 illustrated in FIG. 1 when the first light source 120R is in an on state and the second light source 120L is in an off state. Referring to FIG. 5, light emitted from the first light source 120R is incident on the first incident surface 110a of the directional light guide plate 110. The light incident on the first incident surface 110a is totally internally reflected in the light guide unit 111, and a portion of the totally internally reflected light proceeds toward the first interfaces B1 of the viewing zone separation units 115. Since each of the viewing zone separation units 115 has a refractive index greater than that of the light guide unit 111, the light incident on each of the first interfaces B1 is not totally internally reflected but instead enters the viewing zone separation units 115, is totally internally reflected on each of the second interfaces B2, and is emitted toward the display panel 150 through the exit surface 110c. The light emitted from the directional light guide plate 110 is modulated into an image to be displayed on the display panel 150 and proceeds toward a viewing zone corresponding to the right eye $E_R$ of the viewer.

FIG. 6 illustrates a cross-sectional view of the operation of the directional light guide plate 110 illustrated in FIG. 1 when the first light source 120R is in an off state and the second light source 120L is in an on state. Referring to FIG. 6, light emitted from the second light source 120L is incident on the second incident surface 110b of the directional light guide plate 110. The light incident on the second incident surface 110b is totally internally reflected in the light guide unit 111, and a portion of the totally internally reflected light enters the viewing zone separation units 115 through each of the second interfaces B2 of the viewing zone separation units 115, is totally internally reflected again on each of the first interfaces B1, and is emitted toward the display panel 150. The light emitted from the directional light guide plate 110 is modulated into an image on the display panel 150 and proceeds toward a viewing zone corresponding to the left eye $E_L$ of the viewer.

Referring to FIG. 7, in a 3D mode, the display panel 150 divides right-eye and left-eye images R and L time-sequentially and alternately displays the right-eye and left-eye images R and L.

Referring back to FIGS. 5 and 6, the first and second light sources 120R and 120L emit light in synchronization with the alternately displayed right-eye and left-eye images R and L of the display panel 150. That is, the first light source 120R emits light at time periods T1, T3, . . . when the display panel 150 displays the right-eye images R, and the second light source 120L emits light at time periods T2, T4, . . . when the display panel 150 displays the left-eye images L. As illustrated in FIG. 5, if the first light source 120R emits light, light emitted from the directional light guide plate 110 is modulated into the right-eye image R on the display panel 150 and proceeds toward the viewing zone corresponding to the right eye $E_R$ of the viewer, and thus the viewer sees the right-eye image R with the right eye $E_R$. Also, as illustrated in FIG. 6, if the second light source 120L emits light, light emitted from the directional light guide plate 110 is modulated into the left-eye image L on the display panel 150 and proceeds toward the viewing zone corresponding to the left eye $E_L$ of the viewer, and thus the viewer sees the left-eye image L with the left eye $E_L$.

As such, the viewer may experience a 3D effect by time-sequential viewing of the right-eye and left-eye images R and L, respectively with the right and left eyes $E_R$ and $E_L$.

Figure 8:
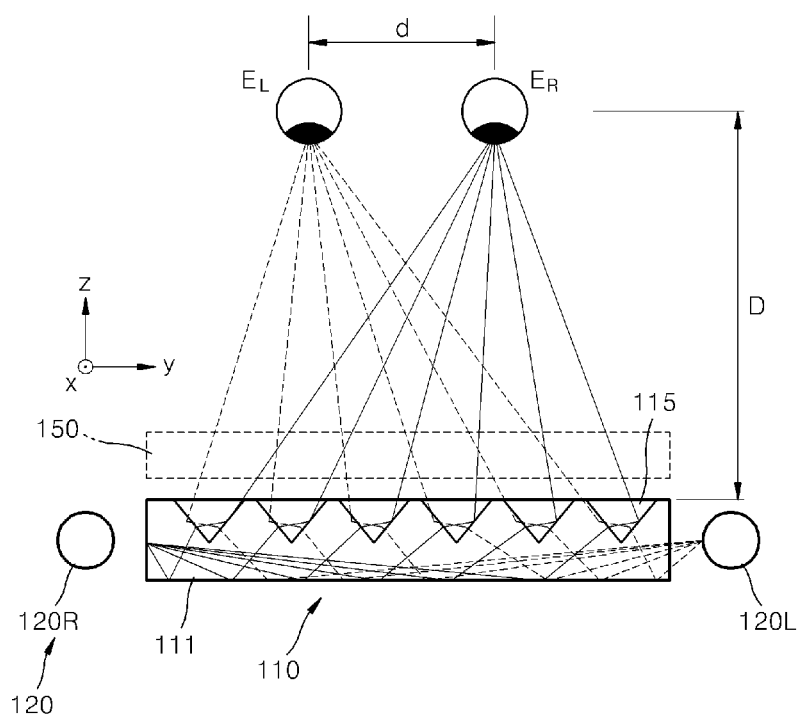
FIG. 8 is a diagram illustrating a cross-sectional view for a two-dimensional (2D) mode operation of a 3D image display apparatus.

A two-dimensional (2D) mode operation of the 3D image display apparatus 100 is described herein with reference to FIG. 8.

Referring to FIG. 8, in a 2D mode, the 3D image display apparatus 100 may display a 2D image on the display panel 150 by simultaneously driving the first and second light sources 120R and 120L. If the first and second light sources 120R and 120L simultaneously emit light, the viewer sees the 2D image displayed on the display panel 150 simultaneously with the right and left eyes $E_R$ and $E_L$.

As such, the light source unit 120 and the directional light guide plate 110 form a 2D/3D switchable directional surface light source for emitting, in a 3D mode, directional light separated into viewing zones, and emitting, in a 2D mode, light not separated into viewing zones. Also, since the 2D/3D switchable directional surface light source is used, the 3D image display apparatus 100 may easily display a 3D image and may easily switch a display image between a 2D image and a 3D image.

Figure 9:
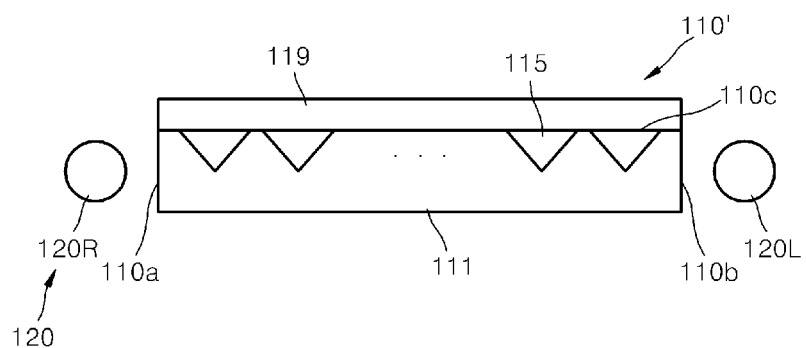
FIG. 9 is a diagram illustrating a cross-sectional view of another example of a directional light guide plate.

FIG. 9 illustrates a cross-sectional view of another example of a directional light guide plate 110', in a modified example of the directional light guide plate 110 illustrated in FIG. 2. Referring to FIG. 9, in addition to the above-described light guide unit 111 and the viewing zone separation units 115, the directional light guide plate 110' further includes a cover unit 119 formed on the exit surface 110c. The cover unit 119 may be formed of a transparent material having a refractive index equal to or greater than that of the viewing zone separation units 115, in order to prevent light to be emitted from the viewing zone separation units 115 from being totally internally reflected at the interface (along exit surface 110c) between the viewing zone separation units 115 and the cover unit 119.

Figure 10:
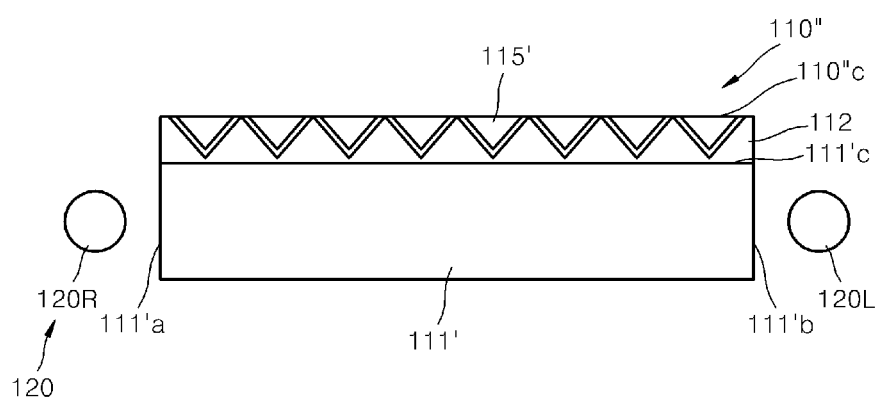
FIG. 10 is a diagram illustrating a cross-sectional view of another example of a directional light guide plate.

FIG. 10 illustrates a cross-sectional view of another example of a directional light guide plate 110", in another modified example of the directional light guide plate 110 illustrated in FIG. 2. Referring to FIG. 10, instead of the light guide unit 111, the directional light guide plate 110" includes a flat-panel first transparent body 111' including first and second incident surfaces 111'a and 111'b, and a second transparent body 112 contacting the first and second interfaces (similar to interfaces B1 and B2 as illustrated in FIG. 4) of the viewing zone separation units 115'. The flat-panel first transparent body 111' and the second transparent body have an interface along surface 111'c. The surface of the second transparent body 112 that includes the viewing zone separation units 115' forms an exit surface 110"c. The second transparent body 112 may be formed of a transparent material having a refractive index equal to or greater than that of the first transparent body 111' and less than that of the viewing zone separation units 115'.

If the second transparent body 112 has a refractive index equal to that of the first transparent body 111', the directional light guide plate 110" may have a similar optical structure as that of the directional light guide plate 110. In this case, the first transparent body 111' may be implemented as a typical light guide plate, and the second transparent body 112 and the viewing zone separation units 115 may be combined to form a film sheet. Also, if the film sheet formed of the second transparent body 112 and the viewing zone separation units 115 is bonded to a typical light guide plate, i.e., the first transparent body 111', the directional light guide plate 110" may be easily formed.

Figure 11:
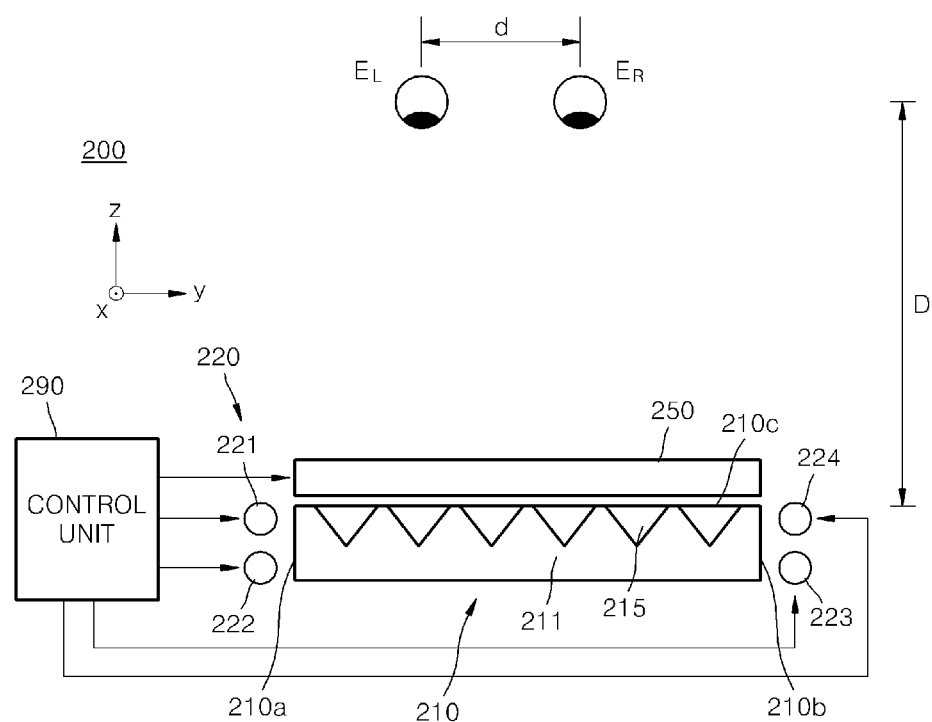
FIG. 11 is a diagram illustrating another example of a 3D image display apparatus.

FIG. 11 illustrates a 3D image display apparatus 200, according to another example.

Referring to FIG. 11, the 3D image display apparatus 200 includes a directional light guide plate 210, a light source unit 220, a display panel 250, and a control unit 290.

The directional light guide plate 210 includes a flat-panel light guide unit 211, and a plurality of viewing zone separation units 215 formed in one flat surface of the light guide unit 211 to provide an exit surface 210c. The directional light guide plate 210 has a similar structure as the directional light guide plate 110 illustrated in FIGS. 1 through 4 except that first and second inclination angles θ1 and θ2 of first and second interfaces (similar to interfaces B1 and B2 as illustrated in FIG. 4) between the light guide unit 211 and the viewing zone separation units 215 are designed in consideration of multiple view points.

The light source unit 220 includes first through fourth light sources 221 through 224. Each of the first through fourth light sources 221 through 224 may be a linearly aligned LED array, a CCFL, or other linear light source. The first and second light sources 221 and 222 are disposed at a side of a first incident surface 210a of the directional light guide plate 210, and the third and fourth light sources 223 and 224 are disposed at a side of a second incident surface 210b of the directional light guide plate 210. In this case, the first and second light sources 221 and 222 are disposed in parallel with each other in a thickness direction of the first incident surface 210a of the directional light guide plate 210 (i.e., in a direction along the z-axis). Likewise, the third and fourth light sources 223 and 224 are disposed in parallel with each other in a thickness direction of the second incident surface 210b of the directional light guide plate 210 (i.e., in a direction along the z-axis).

Figure 12:
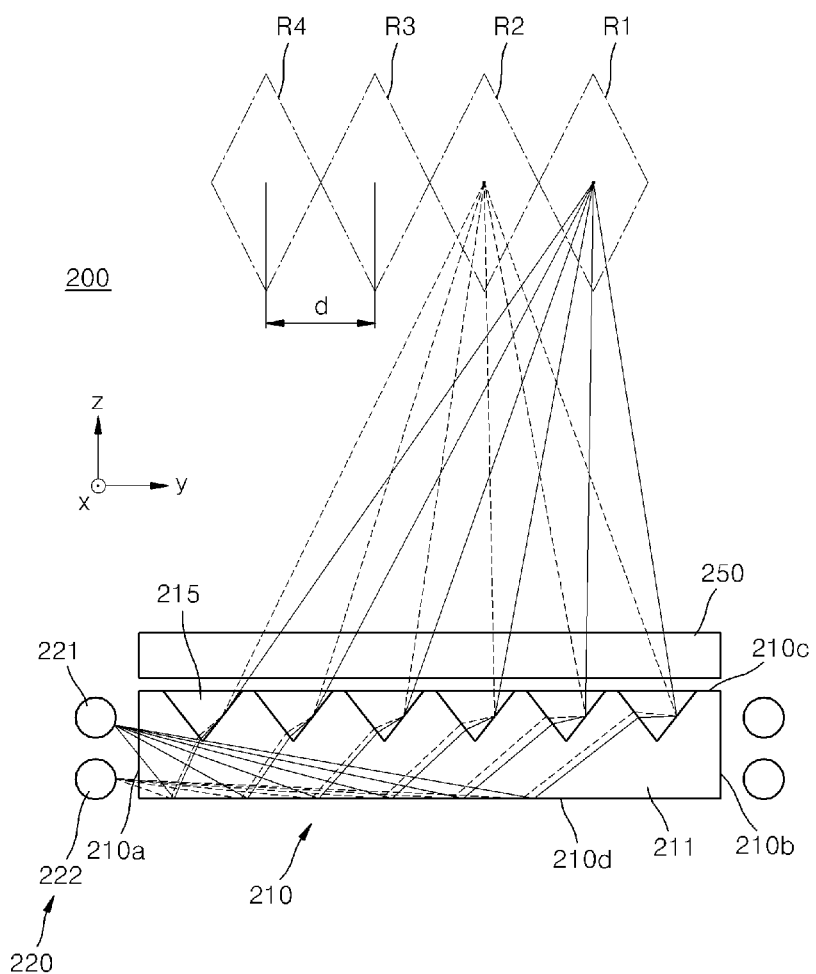
FIGS. 12 and 13 are diagrams illustrating cross-sectional views for an example of a 3D mode operation of a 3D image display apparatus.
Figure 13:
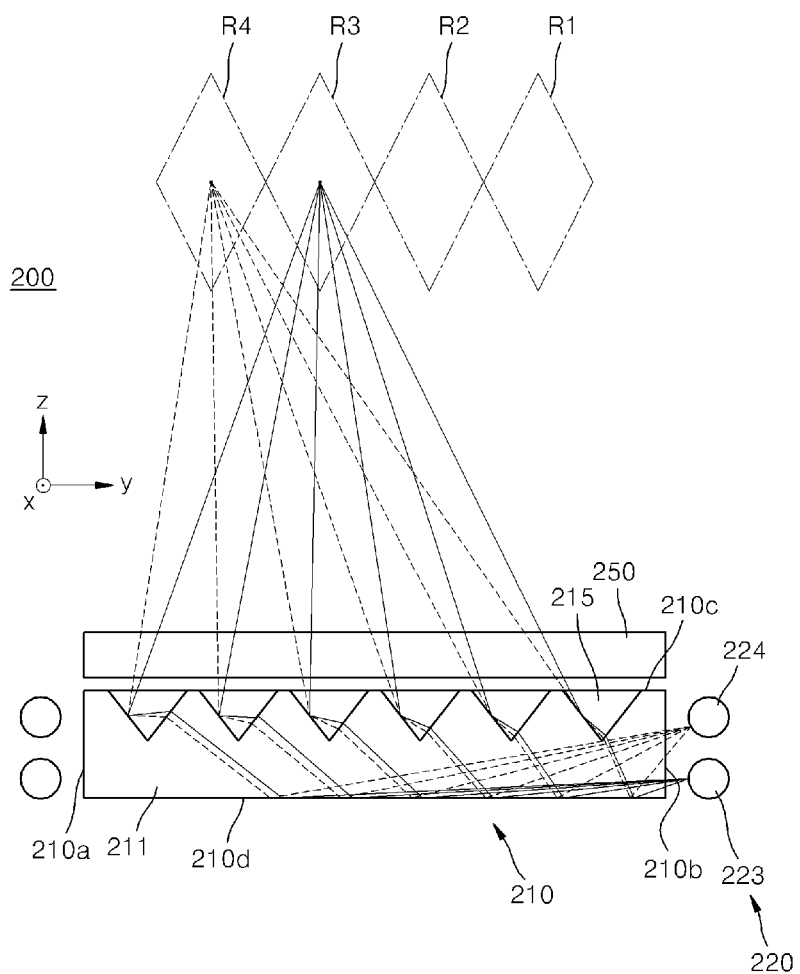

As illustrated in FIG. 12, if the first and second light sources 221 and 222 are disposed at the side of the first incident surface 210a in parallel with each other in a direction along the z-axis, paths (solid lines) of light emitted from the first light source 221 and incident on the light guide unit 211 differ from paths (dashed lines) of light emitted from the second light source 222 and incident on the light guide unit 211. Likewise, as illustrated in FIG. 13, paths (solid lines) of light emitted from the third light source 223 and incident on the light guide unit 211 differ from paths (dashed lines) of light emitted from the fourth light source 224 incident on the light guide unit 211. As described above, light emitted from the first through fourth light sources 221 through 224 are incident on the light guide unit 211 along different optical paths, and thus light emitted from the directional light guide plate 210 is separated into different viewing zones by the viewing zone separation units 215. That is, light emitted from the first light source 221 of which a light emitting point is disposed at an upper side of the first incident surface 210a proceeds toward a first viewing zone R1, and light emitted from the second light source 222 of which a light emitting point is disposed at an lower side of the first incident surface 210a proceeds toward a second viewing zone R2. Likewise, light emitted from the third light source 223 of which a light emitting point is disposed at a lower side of the second incident surface 210b proceeds toward a third viewing zone R3, and light emitted from the fourth light source 224 of which a light emitting point is disposed at an upper side of the second incident surface 210b proceeds toward a fourth viewing zone R4. The first through fourth viewing zones R1 through R4 may be designed to have a binocular parallax of about 60 cm to about 70 cm at a viewing distance D.

In the above example, the directional light guide plate 210 and the light source unit 220 form a directional surface light source for providing multiple viewing zones.

The display panel 250 and the control unit 290 have similar structures as the display panel 150 and the control unit 190 illustrated in FIGS. 1 through 4, except that images are provided to multiple view points in a 3D mode.

Figure 14:
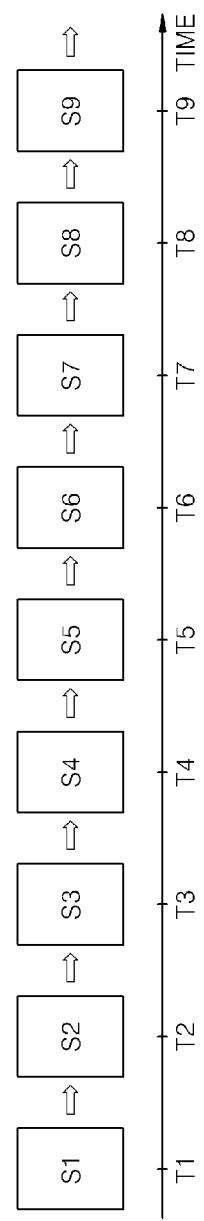
FIG. 14 is a diagram illustrating time-sequentially displayed images on a display panel in a 3D mode of a 3D image display apparatus.

Operation of the 3D image display apparatus 200 is described herein with reference to FIGS. 12 through 14.

FIGS. 12 and 13 illustrate cross-sectional views for an example of a 3D mode operation of the 3D image display apparatus 200 illustrated in FIG. 11. In FIG. 12, solid lines represent optical paths when only the first light source 221 is in an on state, and dashed lines represent optical paths when only the second light source 222 is in an on state. Likewise, in FIG. 13, solid lines represent optical paths when only the third light source 223 is in an on state, and dashed lines represent optical paths when only the fourth light source 224 is in an on state.

In one example of a 3D mode, the 3D image display apparatus 200 sequentially drives the first through fourth light sources 221 through 224. Meanwhile, light emitted from the first light source 221 proceeds toward the first viewing zone R1, light emitted from the second light source 222 proceeds toward the second viewing zone R2, light emitted from the third light source 223 proceeds toward the third viewing zone R3, and light emitted from the fourth light source 224 proceeds toward the fourth viewing zone R4. Accordingly, if the first through fourth light sources 221 through 224 are sequentially driven, light exiting from the directional light guide plate 210 sequentially proceeds toward the first through fourth viewing zones R1 through R4.

Referring to FIG. 14, in a 3D mode, the display panel 250 divides time and alternately displays different view-point images S1, S2, S3, . . . . In this example, the directional light guide plate 210 and the light source unit 220 form a directional surface light source for providing the first through fourth viewing zones R1 through R4, and light sequentially proceeds toward the first through fourth viewing zones R1 through R4 by sequentially driving the first through fourth light sources 221 through 224. For example, the display panel 250 displays the view-point images S1, S5, . . . corresponding to the first viewing zone R1 in time periods T1, T5, . . . , and the first light source 221 is driven in the time periods T1, T5, . . . in synchronization with the displayed view-point images S1, S5, . . . .

As such, the first through fourth light sources 221 through 224 are sequentially driven in synchronization with images displayed on the display panel 250 and thus each view-point image may be viewed in a corresponding viewing zone. Accordingly, if right and left eyes $E_R$ and $E_L$ of a viewer are respectively located in the first and second viewing zones R1 and R2, as illustrated in FIG. 12, the viewer sees a corresponding view-point image with the right eye $E_R$ when the first light source 221 is driven, and sees a corresponding view-point image with the left eye $E_L$ when the second light source 222 is driven, and thus may experience a 3D effect due to a binocular parallax between the two view points.

Meanwhile, similar to the above descriptions provided in relation to FIG. 8, in 2D mode, the first through fourth light sources 221 through 224 may be simultaneously driven and the display panel 250 displays a typical 2D image.

Although four view points are achieved by disposing two light sources (221 and 222, or 223 and 224) at a side of each incident surface (210a or 210b) in FIGS. 11 through 13, the current description is not limited thereto. It may be understood by one of ordinary skill in the art that a larger number of view points may be achieved by increasing the number of light sources disposed at a side of each incident surface of the directional light guide plate 210.

As described above, according to the one or more of the above examples, one or more of the following effects may be provided.

First, in comparison to an apparatus where a viewing zone separation optical plate is bonded onto a front surface of a display panel, a resolution and a light intensity may not be substantially reduced.

Second, a 2D mode and a 3D mode may be relatively simply switched.

Third, multiple viewing zones may be provided.

Fourth, a manufacturing process for producing a 3D display apparatus may be simplified, manufacturing costs may be lowered, and an optical design of various components of a 3D display apparatus may be diversified.

A number of examples have been described above. Nevertheless, it will be understood that various modifications may be made. It should be understood that the examples described herein should be considered in a descriptive sense only and not for purposes of limitation. Descriptions of features or aspects within each example should typically be considered as available for other similar features or aspects in other examples. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A directional light guide plate for a two-dimensional (2D)/three-dimensional (3D) switchable directional surface light source, the directional light guide plate comprising:
   a light guide unit comprising first and second incident surfaces respectively formed on first and second side surfaces on substantially opposing sides of the light guide unit, configured to guide light incident on the first and second incident surfaces via total internal reflection inside the light guide unit; and
   viewing zone separation units formed of a substantially transparent material having a refractive index greater than that of the light guide unit, each of the viewing zone separation units being aligned in parallel with each other and disposed in a flat third surface of the light guide unit, wherein each of the viewing zone separation units comprises:
      a first interface contacting the light guide unit and extending in a lengthwise direction with respect to the first incident surface;

a second interface contacting the light guide unit and extending in a lengthwise direction with respect to the second incident surface; and an exit surface, and wherein the first and second interfaces are formed so that light incident on the first incident surface and light incident on the second incident surface are separated into different viewing zones, wherein the directional light guide plate and a light source unit form the two-dimensional (2D)/three-dimensional (3D) switchable directional surface light source, and wherein each of the viewing zone separation units is formed in a shape in which a first inclination angle between the first interface and the exit surface differs according to a distance from the first incident surface and a distance from the second incident surface, and a second inclination angle between the second interface and the exit surface differs according to the distance from the first incident surface and the distance from the second incident surface.

2. The directional light guide plate of claim 1, wherein each of the viewing zone separation units is formed in a shape in which the first inclination angle decreases from the first incident surface to the second incident surface and the second inclination angle increases from the first incident surface to the second incident surface.

3. The directional light guide plate of claim 2, wherein each of the viewing zone separation units is formed in a shape in which the first inclination angle decreases by a first incremental value for each of the viewing zone separation units from the first incident surface toward the second incident surface and the second inclination angle increases by a second incremental value for each of the viewing zone separation units from the first incident surface toward the second incident surface.

4. The directional light guide plate of claim 1, wherein the number of the viewing zone separation units is N, and the first inclination angle of a $k^{th}$ viewing zone separation unit from the first incident surface is substantially the same as the second inclination angle of a $(N-k+1)^{th}$ viewing zone separation unit from the first incident surface.

5. The directional light guide plate of claim 1, wherein each of the viewing zone separation units has a triangular or trapezoidal cross-section having linear or curved sides, wherein the cross-section is taken in a direction perpendicular to a lengthwise direction of the viewing zone separation units.

6. The directional light guide plate of claim 1, wherein the viewing zone separation units are spaced apart from each other.

7. The directional light guide plate of claim 6, wherein the viewing zone separation units are spaced apart from each other by a gap of about 0.1 μm to 300 μm.

8. The directional light guide plate of claim 1, wherein the exit surface of each of the viewing zone separation units has a length of about 0.1 μm to 100 μm in a direction from the first incident surface toward the second incident surface.

9. The directional light guide plate of claim 1, further comprising a cover unit disposed on the exit surface of each of the viewing zone separation units, wherein the cover unit has a refractive index equal to or greater than that of the viewing zone separation units.

10. The directional light guide plate of claim 1, wherein the light guide unit further comprises:

a first transparent body in contact with the first and second incident surfaces; and a second transparent body in contact with the first and second interfaces of each of the viewing zone separation units.

11. The directional light guide plate of claim 10, wherein the second transparent body is formed of a transparent material having a refractive index equal to or greater than that of the first transparent body, and less than that of the viewing zone separation units.

12. The directional light guide plate of claim 10, wherein the second transparent body is bonded to the viewing zone separation units to form a film sheet.

13. A directional surface light source comprising: a directional light guide plate comprising:

a light guide unit comprising first and second incident surfaces respectively formed on first and second side surfaces on substantially opposing sides of the light guide unit, configured to guide light incident on the first and second incident surfaces via total internal reflection inside the light guide unit; and viewing zone separation units formed of a substantially transparent material having a refractive index greater than that of the light guide unit, each of the viewing zone separation units being aligned in parallel with each other and disposed in a flat third surface of the light guide unit; and a light source unit comprising:

a first light source disposed proximate to the first incident surface of the directional light guide plate; and a second light source disposed proximate to the second incident surface of the directional light guide plate, wherein each of the viewing zone separation units comprises:

a first interface contacting the light guide unit and extending in a lengthwise direction with respect to the first incident surface;

a second interface contacting the light guide unit and extending in a lengthwise direction with respect to the second incident surface; and an exit surface, wherein the first and second interfaces are formed so that light incident on the first incident surface and light incident on the second incident surface are separated into different viewing zones, wherein the first and second light sources are driven in a substantially simultaneous or alternating manner to form a two-dimensional (2D)/three-dimensional (3D) switchable directional surface light source, and wherein each of the viewing zone separation units is formed in a shape in which a first inclination angle between the first interface and the exit surface differs according to a distance from the first incident surface and a distance from the second incident surface, and a second inclination angle between the second interface and the exit surface differs according to the distance from the first incident surface and the distance from the second incident surface.

14. The directional surface light source of claim 13, wherein each of the viewing zone separation units is formed in a shape in which the first inclination angle decreases from the first incident surface to the second incident surface and the second inclination angle increases from the first incident surface to the second incident surface.

15. The directional surface light source of claim 14, wherein each of the viewing zone separation units is formed in a shape in which the first inclination angle decreases by a first incremental value for each of the viewing zone separation units from the first incident surface toward the second incident surface and the second inclination angle increases by a second incremental value for each of the viewing zone separation units from the first incident surface toward the second incident surface.

16. The directional surface light source of claim 13, wherein the number of the viewing zone separation units is N, and the first inclination angle of a $k^{th}$ viewing zone separation unit from the first incident surface is substantially the same as the second inclination angle of a $(N-k+1)^{th}$ viewing zone separation unit from the first incident surface.

17. The directional surface light source of claim 13, wherein the light source unit further comprises:
   a third light source disposed proximate to the first incident surface of the directional light guide plate, having a light emitting point different from that of the first light source; and
   a fourth light source disposed proximate to the second incident surface of the directional light guide plate, having a light emitting point different from that of the second light source.

18. The directional surface light source of claim 17, wherein the third light source is aligned substantially in parallel with the first light source in a direction perpendicular to the flat third surface of the directional light guide plate, and
   wherein the fourth light source is aligned substantially in parallel with the second light source in the direction perpendicular to the flat third surface of the directional light guide plate.

19. A three-dimensional (3D) image display apparatus comprising:
   a directional surface light source comprising:
      a directional light guide plate comprising:
         a light guide unit comprising first and second incident surfaces respectively formed on first and second side surfaces on substantially opposing sides of the light guide unit, configured to guide light incident on the first and second incident surfaces via total internal reflection inside the light guide unit; and
         viewing zone separation units formed of a substantially transparent material having a refractive index greater than that of the light guide unit, each of the viewing zone separation units being aligned in parallel with each other and disposed in a flat third surface of the light guide unit; and a light source unit comprising:
      a first light source disposed proximate to the first incident surface of the directional light guide plate; and
      a second light source disposed proximate to the second incident surface of the directional light guide plate;
   a display panel disposed proximate to an emission surface of the directional surface light source, to display an image; and
   a control unit configured to control the directional surface light source and the display panel,
   wherein each of the viewing zone separation units comprises:
      a first interface contacting the light guide unit and extending in a lengthwise direction with respect to the first incident surface;
      a second interface contacting the light guide unit and extending in a lengthwise direction with respect to the second incident surface; and
      an exit surface,
   wherein the first and second interfaces are formed so that light incident on the first incident surface and light incident on the second incident surface are separated into different viewing zones, and
   wherein the control unit drives the first and second light sources of the directional surface light source in a substantially alternating manner in a three-dimensional (3D) mode, and drives the first and second light sources of the directional surface light source in a substantially simultaneous manner in a two-dimensional (2D) mode.

20. The 3D image display apparatus of claim 19, wherein each of the viewing zone separation units is formed in a shape in which a first inclination angle between the first interface and the exit surface differs according to a distance from the first incident surface and a distance from the second incident surface, and a second inclination angle between the second interface and the exit surface differs according to the distance from the first incident surface and the distance from the second incident surface.

21. The 3D image display apparatus of claim 20, wherein each of the viewing zone separation units is formed in a shape in which the first inclination angle decreases from the first incident surface to the second incident surface and the second inclination angle increases from the first incident surface to the second incident surface.

22. The 3D image display apparatus of claim 21, wherein each of the viewing zone separation units is formed in a shape in which the first inclination angle decreases by a first incremental value for each of the viewing zone separation units from the first incident surface toward the second incident surface and the second inclination angle increases by a second incremental value for each of the viewing zone separation units from the first incident surface toward the second incident surface.

23. The 3D image display apparatus of claim 20, wherein the number of the viewing zone separation units is N, and the first inclination angle of a $k^{th}$ viewing zone separation unit from the first incident surface is substantially the same as the second inclination angle of a $(N-k+1)^{th}$ viewing zone separation unit from the first incident surface.

24. The 3D image display apparatus of claim 19 wherein the light source unit further comprises:
   a third light source disposed proximate to the first incident surface of the directional light guide plate, having a light emitting point different from that of the first light source; and
   a fourth light source disposed proximate to the second incident surface of the directional light guide plate, having a light emitting point different from that of the second light source, and
   wherein the control unit drives the first through fourth light sources in a substantially sequential manner in the 3D mode, and drives the first through fourth light sources in a substantially simultaneous manner in the 2D mode.

25. The 3D image display apparatus of claim 24, wherein the third light source is aligned substantially in parallel with the first light source in a direction perpendicular to the flat third surface of the directional light guide plate, and
   wherein the fourth light source is aligned substantially in parallel with the second light source in the direction perpendicular to the flat third surface of the directional light guide plate.

* * * * *